US011706203B2

(12) United States Patent
Bhala et al.

(10) Patent No.: US 11,706,203 B2
(45) Date of Patent: Jul. 18, 2023

(54) METHOD FOR SECONDARY AUTHENTICATION

(71) Applicant: Citrix Systems, Inc., Fort Lauderdale, FL (US)

(72) Inventors: Aayush Bhala, Bangalore (IN); Praveen Raja Dhanabalan, Bangalore (IN); Shubham Choudhary, Bangalore (IN)

(*) Notice: Subject to any disclaimer, the term of this patent is extended or adjusted under 35 U.S.C. 154(b) by 36 days.

(21) Appl. No.: 17/320,506

(22) Filed: May 14, 2021

(65) Prior Publication Data

US 2022/0368686 A1   Nov. 17, 2022

(51) Int. Cl.
| | |
|---|---|
| *H04L 9/40* | (2022.01) |
| *H04L 9/00* | (2022.01) |
| *H04L 9/06* | (2006.01) |
| *H04L 43/0876* | (2022.01) |
| *H04W 64/00* | (2009.01) |
| *H04L 43/0864* | (2022.01) |

(52) U.S. Cl.
CPC .............. *H04L 63/08* (2013.01); *H04L 9/008* (2013.01); *H04L 9/0643* (2013.01); *H04L 43/0864* (2013.01); *H04L 43/0876* (2013.01); *H04L 2463/082* (2013.01); *H04W 64/00* (2013.01)

(58) Field of Classification Search
CPC ....... H04L 63/08; H04L 9/008; H04L 9/0643; H04L 43/0864; H04L 43/0876; H04L 2463/082; H04L 63/107; H04L 2209/80; H04L 9/3226; H04W 64/00; H04W 12/06; H04W 12/63
See application file for complete search history.

(56) References Cited

U.S. PATENT DOCUMENTS

| | | | |
|---|---|---|---|
| 6,345,361 B1* | 2/2002 | Jerger | G06F 21/62 713/323 |
| 7,949,641 B1* | 5/2011 | Eatough | H04L 63/123 707/705 |
| 8,417,954 B1* | 4/2013 | Sagal | G06F 21/64 713/176 |
| 8,656,020 B1* | 2/2014 | Rademacher | G06F 16/9574 709/226 |
| 8,676,759 B1* | 3/2014 | Zhu | G06F 11/1469 707/638 |
| 10,037,330 B1* | 7/2018 | Burshteyn | G06F 16/122 |
| 10,037,429 B1* | 7/2018 | Rodriguez Bravo | G06F 21/6218 |
| 10,200,364 B1* | 2/2019 | Ketharaju | H04L 63/0853 |

(Continued)

*Primary Examiner* — Aravind K Moorthy

(57) ABSTRACT

Described embodiments provide systems and methods for validating a request to perform an action to access at least one file. A computing device can receive a request from the client, the request being to perform an action to access at least one file and including a first computed value indicative of one or more previous actions on files. The computing device may compare the first computed value to a second computed value maintained by the computing device independently from the first computed value. The second computed value may be indicative of the one or more previous actions on the files. The computing device may perform secondary authentication in addition to primary authentication for the client, responsive to an indication of trustworthiness of the client or the file according to the comparison of the first computed value to the second computed value.

20 Claims, 8 Drawing Sheets

(56) References Cited

U.S. PATENT DOCUMENTS

| | | | |
|---|---|---|---|
| 10,505,736 B1* | 12/2019 | Meixler | H04L 9/3236 |
| 10,546,130 B1* | 1/2020 | Chaney | G06F 16/2477 |
| 10,565,251 B2* | 2/2020 | Ambar | G06F 16/48 |
| 10,602,202 B1* | 3/2020 | Taylor | H04N 21/2353 |
| 10,630,673 B1* | 4/2020 | Lingampally | G06F 21/41 |
| 10,666,708 B1* | 5/2020 | Gavalas | H04L 67/06 |
| 10,949,388 B2* | 3/2021 | Adluri | H04L 9/0637 |
| 11,113,152 B1* | 9/2021 | Jha | G06F 11/1451 |
| 11,347,681 B2* | 5/2022 | Kumar | G06F 16/164 |
| 11,443,386 B2* | 9/2022 | Bungert | G06Q 40/025 |
| 11,444,941 B2* | 9/2022 | Lynn | H04L 63/0861 |
| 2002/0101459 A1* | 8/2002 | Herle | H04M 1/72406 |
| | | | 715/866 |
| 2003/0182414 A1* | 9/2003 | O'Neill | G06F 9/30021 |
| | | | 717/170 |
| 2003/0187866 A1* | 10/2003 | Zelenka | G06F 16/289 |
| | | | 707/999.102 |
| 2004/0003389 A1* | 1/2004 | Reynar | G06F 8/65 |
| | | | 717/178 |
| 2004/0199809 A1* | 10/2004 | Hanam | H04L 1/0061 |
| | | | 714/E11.04 |
| 2005/0203851 A1* | 9/2005 | King | H04L 67/1082 |
| | | | 705/51 |
| 2005/0257205 A1* | 11/2005 | Costea | G06F 8/65 |
| | | | 717/168 |
| 2006/0075494 A1* | 4/2006 | Bertman | G06F 21/566 |
| | | | 726/22 |
| 2006/0242157 A1* | 10/2006 | McCuller | H04L 67/06 |
| 2009/0203451 A1* | 8/2009 | Gatto | H04L 47/20 |
| | | | 463/42 |
| 2009/0271779 A1* | 10/2009 | Clark | G06F 16/178 |
| | | | 707/999.01 |
| 2009/0307302 A1* | 12/2009 | Tennant | G06F 16/172 |
| | | | 709/203 |
| 2010/0228737 A1* | 9/2010 | Riemers | G06F 16/9574 |
| | | | 707/747 |
| 2011/0054977 A1* | 3/2011 | Jaffer | G06Q 10/06 |
| | | | 706/50 |
| 2011/0087690 A1* | 4/2011 | Cairns | H04L 67/1097 |
| | | | 707/769 |
| 2011/0125781 A1* | 5/2011 | Kasahara | H04N 1/00244 |
| | | | 707/769 |
| 2013/0125107 A1* | 5/2013 | Bandakka | G06F 11/1433 |
| | | | 717/171 |
| 2014/0122451 A1* | 5/2014 | Euresti | G06F 16/174 |
| | | | 707/693 |
| 2014/0156866 A1* | 6/2014 | Kallstrom | H04L 67/01 |
| | | | 718/1 |
| 2015/0058301 A1* | 2/2015 | Kolodner | G06F 16/1748 |
| | | | 707/692 |
| 2015/0086014 A1* | 3/2015 | Adkins | H04N 1/4486 |
| | | | 380/243 |
| 2016/0112413 A1* | 4/2016 | Wang | H04L 63/0846 |
| | | | 713/171 |
| 2016/0191249 A1* | 6/2016 | Panchapakesan | H04L 67/1074 |
| | | | 713/168 |
| 2016/0292048 A1* | 10/2016 | Dolan | G06F 3/065 |
| 2016/0365983 A1* | 12/2016 | Shahabuddin | G06F 21/645 |
| 2017/0180394 A1* | 6/2017 | Crofton | G06F 21/64 |
| 2017/0220575 A1* | 8/2017 | Hohwald | G06N 20/00 |
| 2018/0081717 A1* | 3/2018 | Li | G06Q 10/06 |
| 2018/0198813 A1* | 7/2018 | Grubb | H04L 9/3239 |
| 2018/0336209 A1* | 11/2018 | Burshteyn | H04L 9/0631 |
| 2018/0367596 A1* | 12/2018 | Ananthapur Bache | H04L 67/104 |
| 2019/0073676 A1* | 3/2019 | Wang | H04W 4/029 |
| 2019/0087432 A1* | 3/2019 | Sion | G06F 16/13 |
| 2019/0109834 A1* | 4/2019 | Lyons | H04L 63/08 |
| 2019/0132308 A1* | 5/2019 | Graham | H04L 63/0876 |
| 2019/0205555 A1* | 7/2019 | Duffy | G06F 21/6218 |
| 2020/0019624 A1* | 1/2020 | Barnett | G06F 16/119 |
| 2020/0059353 A1* | 2/2020 | Liu | H04L 67/1021 |
| 2020/0084264 A1* | 3/2020 | Staubly | G06F 9/54 |
| 2020/0177668 A1* | 6/2020 | Guerrero | H04L 69/14 |
| 2020/0184097 A1* | 6/2020 | T | H04L 9/3239 |
| 2020/0241960 A1* | 7/2020 | Yanovsky | G06F 11/1076 |
| 2020/0252457 A1* | 8/2020 | Zakrzewski | H04L 9/3213 |
| 2020/0322321 A1* | 10/2020 | Lynn | H04L 63/08 |
| 2021/0044609 A1* | 2/2021 | Keshtkarjahromi | H04L 63/102 |
| 2021/0173949 A1* | 6/2021 | Keith, Jr. | G06F 21/604 |
| 2021/0216450 A1* | 7/2021 | Hirko | H04L 67/1095 |
| 2021/0266743 A1* | 8/2021 | Kvochko | H04W 12/37 |
| 2021/0352470 A1* | 11/2021 | Barer | H04L 51/212 |
| 2021/0407683 A1* | 12/2021 | Khasnabish | G16H 50/30 |
| 2022/0059081 A1* | 2/2022 | Chen | H04L 67/34 |
| 2022/0075850 A1* | 3/2022 | Ghorbani | G06F 21/316 |
| 2022/0201021 A1* | 6/2022 | Joshi | G06K 9/6262 |
| 2022/0217001 A1* | 7/2022 | Dhanabalan | H04L 9/3263 |
| 2022/0232004 A1* | 7/2022 | Soman | G06V 20/40 |
| 2022/0255913 A1* | 8/2022 | Zacks | G06F 21/31 |

\* cited by examiner

METHOD FOR SECONDARY AUTHENTICATION

FIELD OF THE DISCLOSURE

The present application generally relates to authentication of users of computing devices, including but not limited to systems and methods for application of secondary authentication to perform an action with use of a computing device.

BACKGROUND

Certain systems can execute one or more processes to mitigate unauthorized attempts to access protected files. The processes may provide protective mechanisms against said unauthorized attempts. Approaches for mitigating unauthorized attempts include verifying whether a request to access a file is generated by a validated device.

SUMMARY

This Summary is provided to introduce a selection of concepts in a simplified form that are further described below in the Detailed Description. This Summary is not intended to identify key features or essential features, nor is it intended to limit the scope of the claims included herewith.

At least one problem with present techniques to access files is that such approaches fail to provide protection against unauthorized attempts (e.g., by an attacker) that seek to gain access to a user session of a validated device, or seek to impersonate a user of the validated device. For instance, an attacker can use certain techniques (e.g., session hijacking) to gain access to the user session. In another example, the attacker may use stolen or counterfeit data to impersonate the user, and therefore gain access to the file. As such, the limitations of the approaches described herein can pose a security risk to certain systems.

The present disclosure is directed towards systems and methods for validating a request from a client (e.g., a smartphone, a laptop, a tablet device, a desktop computer of a user, and/or a client supporting hypertext transfer protocol (HTTP) and/or hypertext transfer protocol secure (HTTPS)) to perform an action (e.g., to access a file, such as uploading a file and/or downloading a file), without affecting user experience of a user of the client (e.g., without increasing an amount of time for performing the action to access the file). Certain systems and/or methods can prevent an unauthorized action to access (e.g., use, obtain, retrieve, transfer, use, update, modify, write, read, execute, upload, and/or download) data or other information (e.g., the file) by performing secondary authentication (e.g., a second factor authentication, biometric authentication, one-time password (OTP) authentication, and/or other types of authentication) for the client (e.g., the client sending the request to perform the action). To determine whether to perform the secondary authentication, a computing device (e.g., a server, such as a backend server supporting HTTP/HTTPS) may use one or more parameters or attributes. The one or more parameters may comprise a first computed value (e.g., a homomorphic hash value, such as a cumulative hash sum of previously downloaded files), a second computed value (e.g., maintained by the computing device independently from the first computed value), proximity or location data of the client (e.g., global positioning system (GPS) data corresponding to a location of the client), geo-location data, geo-fencing data, geo-velocity data, and/or device information (e.g., a unique device identification number and/or a type of device).

The computing device may perform/execute the secondary authentication according to (or based on) a calculated/determined/generated score (e.g., a security or trustworthiness score). For instance, the computing device may use the one or more parameters (e.g., first and second computed values, proximity data of the client, and/or other parameters) to calculate/determine/generate the score, wherein the score can indicate/specify/provide a level of trustworthiness or security of the client/request (e.g., according to a comparison of the first and second computed values, and/or the one or more authentication parameters). In some embodiments, the computing device may use an indication of a level of trustworthiness of the client/file, such as the calculated score, to determine whether to perform the secondary authentication for the client. The indication of the level of trustworthiness/security may be generated/specified/configured according to a comparison of the first computed value (e.g., describing a structure of one or more files) to the second computed value, wherein the computed values may be indicative of one or more previous actions on files (which can include or correspond to one or more copies and/or versions of the requested file).

In one aspect, the present disclosure is directed to a method for determining whether to perform secondary authentication for a client, wherein the client wants to perform an action to access at least one file (e.g., transfer, use, update, modify, upload and/or download of a file, a software program, an application, a web page, a database or record, or any other data container). The method can include receiving, by a computing device, a request from the client. The request may be to perform an action to access a file, and include a first computed value. The first computed value can be indicative of one or more previous actions on files. The computing device may compare the first computed value to a second computed value. The second computed value can be maintained by the computing device independently from the first computed value. The second computed value may be indicative of the one or more previous actions on the files. The computing device may perform secondary authentication in addition to primary authentication for the client, responsive to an indication of trustworthiness of the client or the file according to the comparison of the first computed value to the second computed value.

In some embodiments, the computing device may receive proximity or location data of the client. The computing device may determine a score indicative of a level of trustworthiness according to the comparison and the proximity or location data. In certain embodiments, the client can be a first client. The proximity or location data may comprise at least one of: global positioning system (GPS) data corresponding to a location of the first client, ranging data between the first client and a second client, connection data regarding a network to which the first client and the second client are connected, or round-trip time of communications between the first client and the second client. The computing device may receive the proximity or location data from the second client. The computing device may verify the proximity or location data of the first client according to proximity or location data received from the second client. In some embodiments, determining the score may comprise applying one or more weights to one or more values used to determine the score. At least one of the one or more values may comprise a result of the comparison. In some embodiments, the computing device may generate the one or more weights to apply to the one or more values.

In certain embodiments, the action to access the file may comprise at least one of: upload of the file to the computing device or download of the file from the computing device. In some embodiments, the first computed value may comprise a first homomorphic hash value computed by the client. The second computed value may comprise a second homomorphic hash value computed by the computing device independently from the computation of the first homomorphic hash value by the client. In some embodiments, the computing device may receive, from the client, at least one of: device information, geo-location data, or geo-velocity data corresponding to the client. The computing device may determine a score indicative of a level of trustworthiness according to the comparison and the at least one of: the device information, the geo-location data, or the geo-velocity data corresponding to the client. In some embodiments, the computing device may perform the primary authentication of the client in response to the request. The computing device may perform the secondary authentication of the client responsive to a result of the comparison not satisfying a threshold.

In one aspect, the present disclosure is directed to a computing device for determining whether to perform secondary authentication for a client, wherein the client wants to perform an action to access a file (e.g., upload and/or download of the file). The computing device may comprise at least one processor. The at least one processor may be configured to receive a request from a client. The request may be to perform an action to access a file, and include a first computed value. The first computed value can be indicative of one or more previous actions on files. The at least one processor may be configured to compare the first computed value to a second computed value. The second computed value can be maintained by the computing device independently from the first computed value. The second computed value may be indicative of the one or more previous actions on the files. The at least one processor may be configured to perform secondary authentication in addition to primary authentication for the client, responsive to an indication of trustworthiness of the client or the file according to the comparison of the first computed value to the second computed value.

In some embodiments, the at least one processor can be configured to receive proximity or location data of the client. The at least one processor may be configured to determine a score indicative of a level of trustworthiness according to the comparison and the proximity or location data. In certain embodiments, the client may be a first client. The proximity or location data may comprise at least one of: global positioning system (GPS) data corresponding to a location of the first client, ranging data between the first client and a second client, connection data regarding a network to which the first client and the second client are connected, or round-trip time of communications between the first client and the second client. The at least one processor may be configured to receive the proximity or location data from the second client. The at least one processor may be configured to verify the proximity or location data of the first client according to proximity or location data received from the second client. In some embodiments, the at least one processor may be configured to determine the score by generating one or more weights to apply to one or more values. The one or more values may be used to determine the score. Determining the score may comprise applying the one or more weights to the one or more values. At least one of the one or more values may comprise a result of the comparison.

In some embodiments, the action to access the file may comprise at least one of: upload of the file to the computing device or download of the file from the computing device. In certain embodiments, the first computed value may comprise a first homomorphic hash value computed by the client. The second computed value may comprise a second homomorphic hash value computed by the at least one processor independently from the computation of the first homomorphic hash value by the client. In some embodiments, the at least one processor may be configured to receive, from the client, at least one of: device information, geo-location data, or geo-velocity data corresponding to the client. The at least one processor may be configured to determine a score indicative of a level of trustworthiness according to the comparison and the at least one of: the device information, the geo-location data, or the geo-velocity data corresponding to the client. In some embodiments, the at least one processor may be configured to perform the primary authentication of the client in response to the request. The at least one processor may be configured to perform the secondary authentication of the client responsive to a result of the comparison not satisfying a threshold.

In one aspect, the present disclosure is directed to a non-transitory computer-readable medium storing instructions for determining whether to perform secondary authentication for a client, wherein the client wants to perform an action to access a file (e.g., upload and/or download of the file). The instructions stored in a non-transitory computer-readable medium can be executed by one or more processors. The instructions stored in a non-transitory computer-readable medium may cause the one or more processors to receive a request from a client. The request may be to perform an action to access a file, and include a first computed value. The first computed value may be indicative of one or more previous actions on files. The instructions may cause the one or more processors to compare the first computed value to a second computed value. The second computed value can be maintained by a computing device independently from the first computed value. The second computed value may be indicative of the one or more previous actions on the files. The instructions may cause the one or more processors to perform secondary authentication in addition to primary authentication for the client, responsive to an indication of trustworthiness of the client or the file according to the comparison of the first computed value to the second computed value.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Figure 1A:
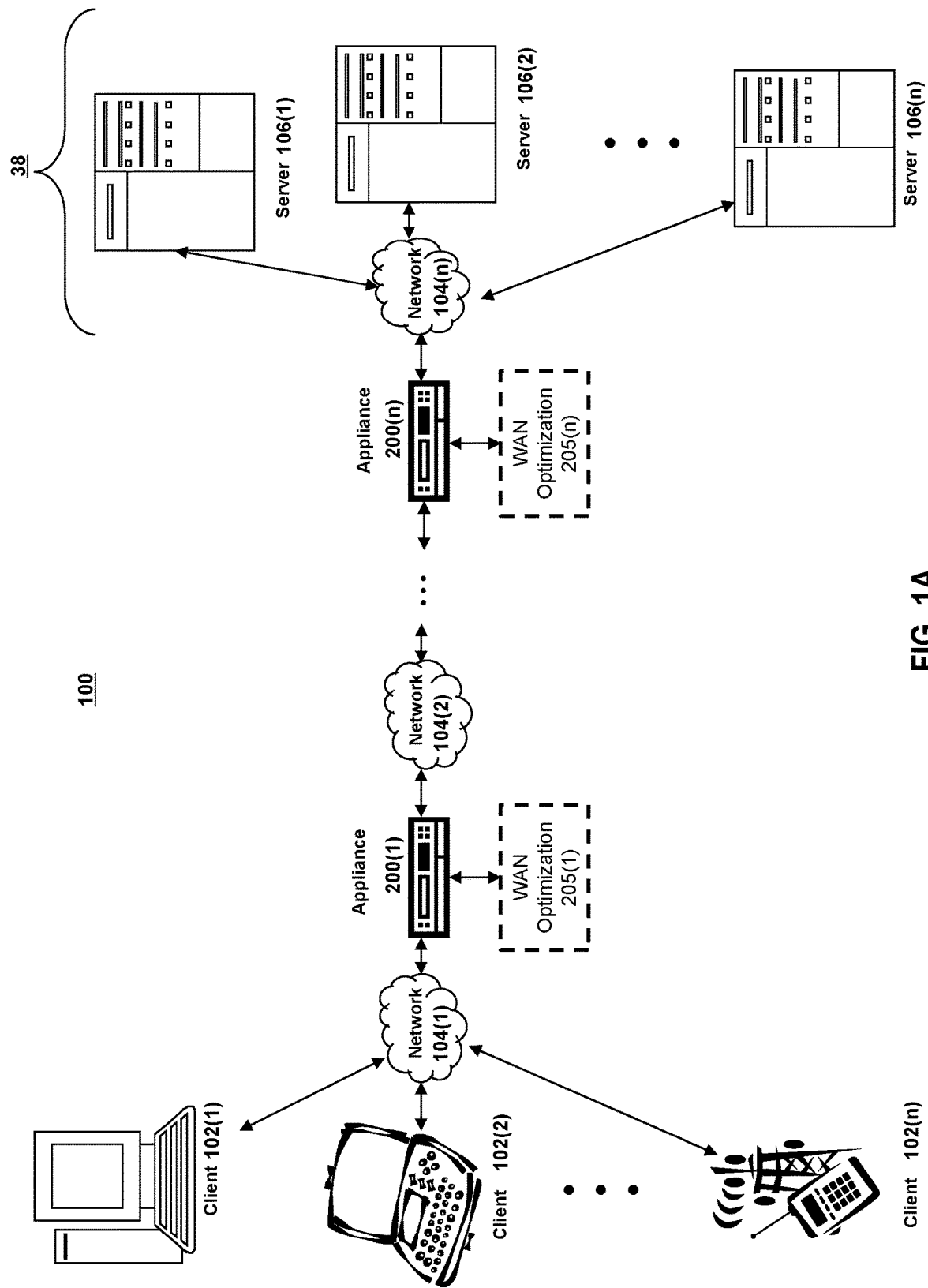
FIG. 1A is a block diagram of a network computing system, in accordance with an illustrative embodiment.

Certain systems and/or methods may attempt to prevent/preclude an unauthorized action (e.g., to access/retrieve a file such as by file upload and/or download) by an entity (e.g., an attacker and/or an unauthorized device). In certain scenarios, a client (e.g., a smartphone, a laptop, a tablet device, a desktop computer of a user, and/or a client supporting HTTP/HTTPS) may send/transmit/communicate a request to a computing device (e.g., a server, such as a backend server supporting HTTP and/or HTTPS), wherein the request can be a request to perform an action (e.g., download/upload a file from/to the computing device). Upon receiving the request, the computing device may verify, determine, or otherwise confirm whether the request originated from (or is sent or transmitted by) a validated, authenticated, authorized, or otherwise trustworthy client. If the computing device determines that an authorized client sent, generated, and/or created the request, the computing device may accept or process the request, and may allow the client to perform the requested action to access at least one file (e.g., download at least one file).

Certain approaches for preventing an unauthorized action to access a file may however suffer from one or more problems/limitations. For example, an unauthorized entity (such as an attacker) can use/deploy certain techniques (e.g., session hijacking) to gain access to a validated/authenticated user session. In another example, an attacker can perform spoofing, and therefore use a stolen and/or counterfeit identity (or other data) to impersonate an authorized user of a client (e.g., to perform an action to access the file(s)). In yet another example, the unauthorized entity may steal or obtain an authenticated client to gain access to a file (and/or data). The problems discussed herein can present/introduce a security risk for the computing device, the client, and/or other components of a system.

To address the problems with present technology discussed herein, the computing device can perform secondary authentication (e.g., dual-factor (or multi-factor) authentication, OTP authentication, biometric authentication, out-of-band authentication, SMS-based verification, security/software token authentication, and/or other types of secondary authentications) for the client. Secondary authentication can be an authentication step or process that is additional to (or on top of) a primary authentication, for instance to enhance security or protection in connection with the requested access. For example, a computing device may perform secondary authentication for a client, to supplement the primary authentication, such that access is granted if both primary authentication and secondary authentication are successful. A user of a client may perform and/or complete the secondary authentication by providing, specifying, and/or indicating additional type(s) of information (e.g., authentication information specific to the user) to the computing device. At least one type of information can be provided during a primary authentication, while additional type(s) of information may be requested and/or specified during the secondary authentication.

However, performing secondary authentication for each request (e.g., a request to perform an action to access the file) can degrade the user experience of a user of the client. For example, performing secondary authentication for each request may require the user to perform an additional authentication process (e.g., biometric scanning) each time a user attempts to perform an action to access an object, application, resource or file (e.g., download and/or upload a file), resulting in more effort from the user, and a potentially more time-consuming, and therefore degraded, experience. In order to avoid performing secondary authentication for each and every request, secondary authentication may be performed in a selective manner (e.g., for certain requests).

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user; and Section C describes embodiments of systems and methods for validating a request to perform an action to access at least one file.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
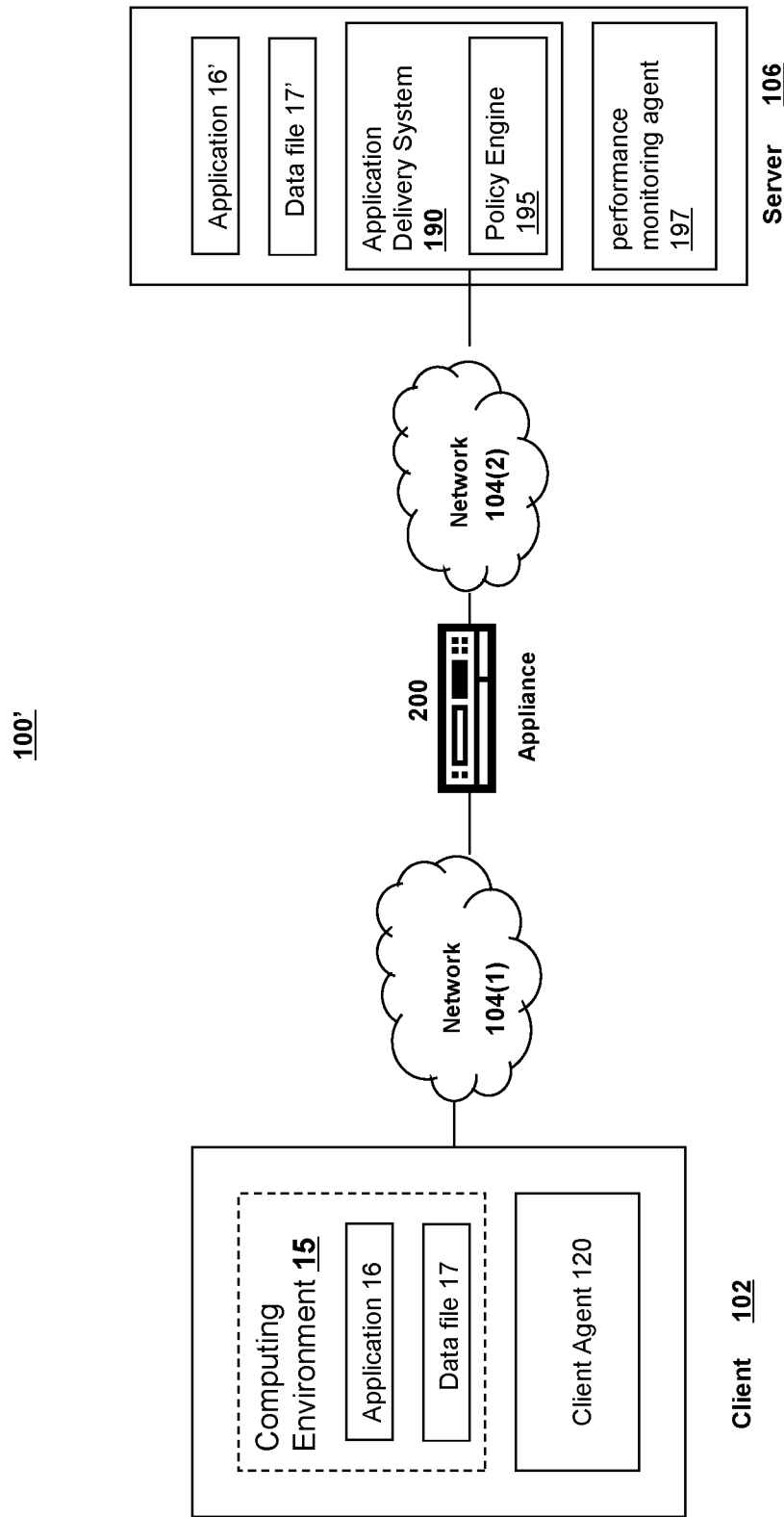
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
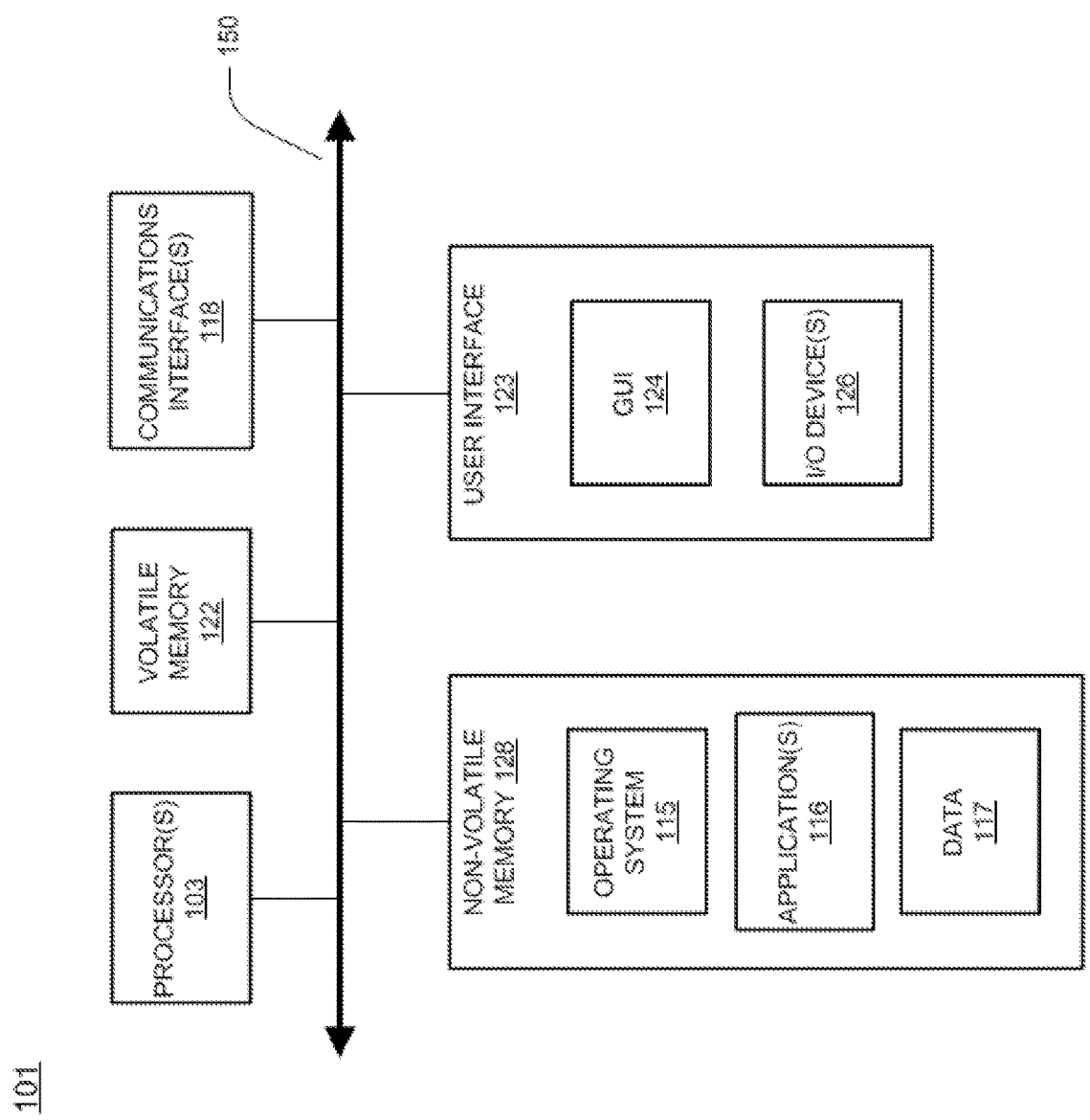
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

Figure 1D:
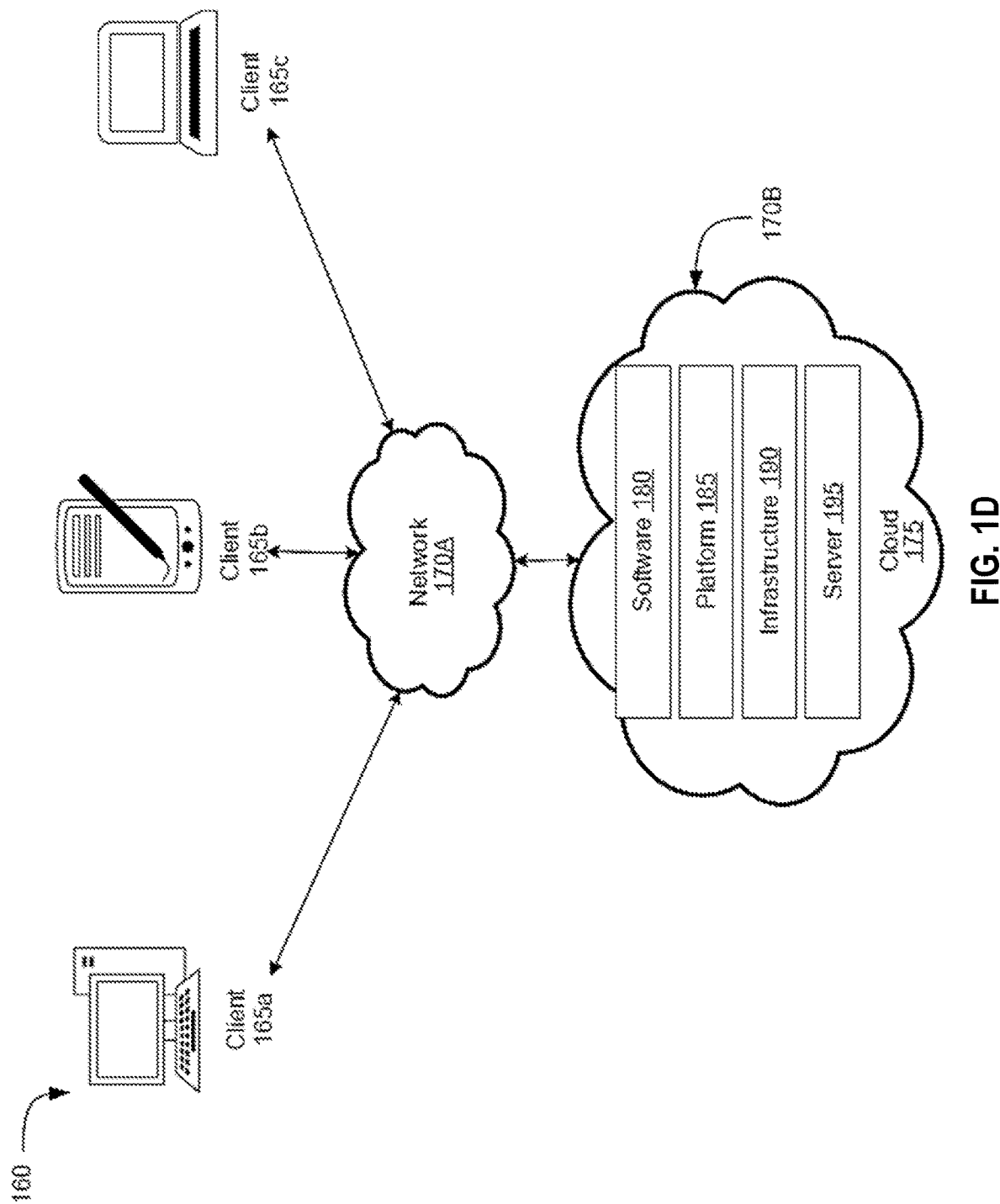
FIG. 1D is a block diagram depicting a computing environment comprising client device in communication with cloud service providers, in accordance with an illustrative embodiment.

Referring to FIG. 1D, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 165 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1C.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Appliance Architecture

Figure 2:
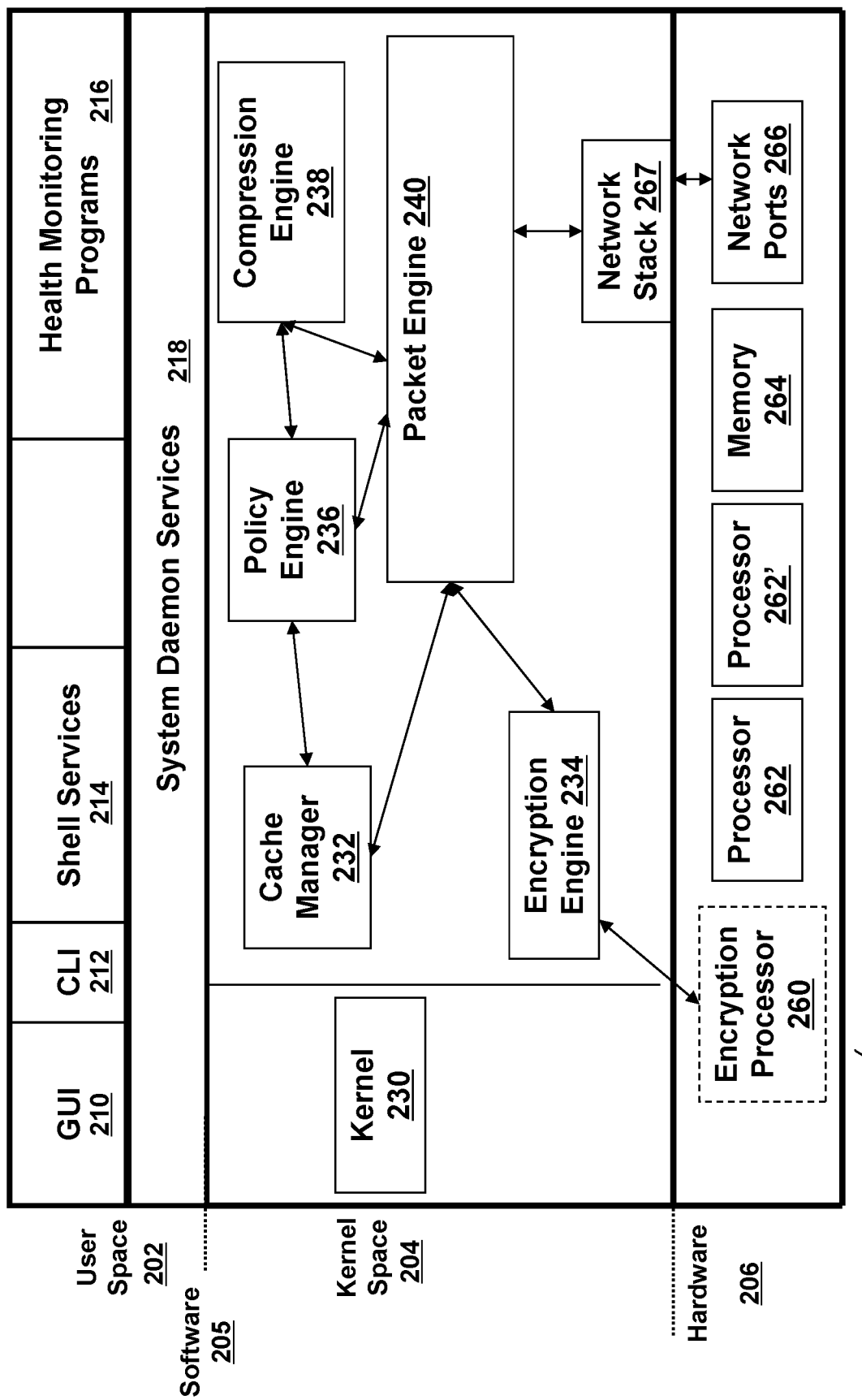
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104.

Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Validating a Request to Perform an Action to Access a File Performing secondary authentication for each request (e.g., a request to perform an action to access the file) can degrade the user experience of a user of the client. For example, performing secondary authentication for each request may require the user to perform an additional authentication process (e.g., biometric scanning) each time a user attempts to perform an action to access a file (e.g., download and/or upload a file), resulting in more effort from the user, and a potentially more time-consuming, and therefore degraded, experience. In order to avoid performing secondary authentication for each and every request, secondary authentication may be performed in a selective manner (e.g., for certain requests).

Certain techniques and implementations (such as techniques that use geo-location data, geo-fencing data, and/or information of a previously accessed client) may perform secondary authentication in a selective manner by performing the secondary authentication for certain requests (instead of for each and every request) from a client. Although these techniques can provide additional security against unauthorized actions to access files, the techniques may introduce other limitations or problems. For instance, an unauthorized entity, such as an attacker, can attempt to access a file by faking and/or fabricating the geo-location data and/or device information of an authorized client device. The unauthorized entity may provide the fabricated geo-location data and/or device information to a computing device performing secondary authentication. Therefore, the unauthorized entity may use the fabricated data to complete the secondary authentication, and therefore improperly gain access to the file(s).

The systems and/or methods presented herein may address the issues, limitations, and or problems discussed above (e.g., faking or fabrication of data to perform secondary authentication) by using an indication of a level of trustworthiness of the client/file/request, such as a calculated score, to determine whether to perform the secondary authentication for the client. The indication of the trustworthiness of the client, request and/or file can be according to (or based on) a comparison of a first computed value to a second computed value. Individual computed values (e.g., a homomorphic hash value, such as a cumulative hash sum) can be indicative of one or more previous actions (e.g., file upload and/or file download). In some embodiments, the computing device may use the indication of the trustworthiness (e.g., security/validity) of the client, request and/or file to determine whether to perform the secondary authentication for the client. The indication of the trustworthiness, for example the score, may be determined (e.g., by the computing device) according to (or based on) a structure of the file (e.g., indicated by a first/second computed value), proximity or location data of the client (e.g., a proximity of the client to one or more authorized clients), and/or other authentication parameters (e.g., device information, geo-location data, geo-velocity data, and/or other parameters).

The systems and/or methods presented herein can include a novel approach for calculating, determining, or otherwise generating a score (or other indications of trustworthiness) for clients of a system (e.g., an enterprise network). The indication of the trustworthiness can be generated or otherwise determined (e.g., by the computing device) according to (or by using) geo-location data, device information (e.g., a unique device identification number and/or a type of device), proximity or location data, a structure of a file (e.g., a local copy of a file from the computing device, obtained via Citrix ShareFile for instance), and/or other data/information/parameters.

In some embodiments, a user of the client may download (or perform other actions to access) a file from the computing device, and/or store/maintain the downloaded file in the client (e.g., using client software). The computing device (e.g., a server) can use information of the structure of the downloaded file (e.g., indicated by first and/or second computed values) to validate or otherwise authenticate a request from the client. The structure of the file may refer to or otherwise include metadata (e.g., timestamp, owner, version, read/write/executable access, file size, file name, history and so on) and/or content of the file. For individual downloaded files, the computing device and/or the client can maintain, store, or otherwise track a history (e.g., a record of the action(s)) of the downloaded file (e.g., via the first and/or second computed values). The history of the downloaded file can include or correspond to a homomorphic hash value, such as a cumulative sum of a hash value of a plurality of files (e.g., files downloaded by the user of the client). Using homomorphic hashing can allow for the utilization of an additive property (or other properties) of homomorphism.

In one example, the user of the client can establish or otherwise initiate another user session from a second client (e.g., log in from the second client). Responsive to establishing another user session, the user may download (or perform other actions) a file from the computing device to the second client. Upon downloading the file, the computing device and/or the second client can individually store or otherwise maintain a computed value (e.g., a hash value, such as a homomorphic hash value) of the downloaded file. If the second client sends, transmits, or communicates a request (e.g., to the computing device) to perform another action (e.g., download a file to the second client), the second client may send, transmit, provide, specify, or otherwise indicate a first computed value to the computing device. Responsive to receiving the first computed value, the computing device may compare the first computed value to a second computed value maintained and/or computed by the computing device (e.g., independently from the first computed value). If the first computed value corresponds to (or matches) the second computed value, the computing device may determine that the received request (e.g., the request to perform another action) is sent by (or originates from) an authenticated, validated, or otherwise trusted client (e.g., the second client).

In the same example, the second client may download (or perform other actions on) a second file from the computing device, responsive to sending a request to perform another action. Responsive to downloading the second file, the second client (or the computing device) can use an additive property of homomorphic hashing to add or incorporate a third computed value (e.g., a homomorphic hash value of the second file) to the first computed value (e.g., stored by the second client). If the second client downloads (or performs other actions) a third file, the second client and/or the computing device may perform authentication (e.g., authentication for the second client) according to (or by using) the sum/combination of the third computed value and the first computed value. As such, the client(s) of the user and/or computing device can use the computed values (e.g., describing or otherwise indicating a structure of the file(s)) to maintain, store, or track the history of the file(s), and therefore authenticate each client of the user.

By using homomorphic hashing techniques, the client(s) of the user may delete and/or modify the downloaded or uploaded file(s) (e.g., the client(s) may not have to maintain a copy of the file). For example, once the client(s) performs an action to access the file(s), and the computed value(s) of the accessed file(s) are stored by the computing device and/or the client(s), the accessed file(s) can be deleted, removed, edited, or otherwise modified. If the client accesses the file, the client (e.g., a client software) can incorporate the computed value of the accessed file (e.g., the third computed value) to the computed value stored by the client (e.g., the first computed value). Separately or independently for instance, the computing device may add the computed value of the accessed file to the computed value (e.g., the second computed value) stored by the computing device (e.g., responsive to accepting a request, from the client, to perform an action to access the file).

In some embodiments, the computing device may determine the authenticity of a request or client (e.g., a request from a client to perform an action to access a file) by verifying, determining, or otherwise calculating the proximity of the client to other clients that are nearby (e.g., proximity and/or location data of the client). The computing device (and/or the client) may determine the proximity (and/or location) data of the client based on (or according to) communications or other data received. Communications can include radio signaling, such as Bluetooth low energy (BLE) signaling, WiFi-Direct signaling, and/or other types of radio signaling. Nearby clients may be verifiable or trusted devices, and may include at least one of: clients of another associated user (e.g., a co-worker or member of the same organization), clients of the same user (e.g., a laptop and/or a mobile phone of a same user), and/or other nearby clients, such as enterprise workspace devices (e.g., Workspace Hub). To detect or otherwise identify the nearby client(s), the computing device (and/or the client) may first identify the device type of the nearby client(s) (e.g., a laptop, a mobile phone, and/or other types of client devices). Responsive to determining the device type of the nearby client(s), the computing device (and/or the client) may identify one or more services of the nearby client(s) (in individual nearby clients) that can be used to determine, gauge, estimate, or otherwise calculate the proximity data. In one example, if the device type of the nearby client corresponds to a mobile phone and/or a tablet, the computing device may determine that Global Positioning System (GPS) services, BLE services, WiFi-Direct services, and/or WiFi-Hotspot services can be used to determine or calculate the proximity data. In another example, if the device type of the nearby client corresponds to a laptop and/or a desktop, the computing device may determine that GPS services, BLE services, and/or WiFi-Hotspot services can be used to determine or otherwise calculate the proximity data.

Responsive to identifying the one or more services of the nearby client(s), the computing device may enable/use precise time synchronization across/between/among the identified nearby clients. For example, the computing device may enable precise time synchronization by using a network time protocol (NTP) and/or measuring or otherwise determining a round-trip time (RTT) between a packet and a corresponding acknowledgement. Responsive to enabling the time synchronization, the proximity of the client to other nearby clients (e.g., the proximity and/or location data of the client) can be determined according to one or more of the following approaches:

- If GPS services are used to determine the proximity and/or location data, the computing device (and/or the client) can determine an amount (e.g., count or density) of nearby clients within a radius (e.g., 200-300 meters).
- If BLE services are used, the computing device (and/or the client) can use the synchronized clocks of the nearby clients to determine the proximity and/or location data of the client. For instance, the computing device (and/or the client) may enable Bluetooth signaling for a certain period of time (e.g., once every 30 seconds) to broadcast, send, or otherwise transmit encrypted messages, wherein the encrypted messages can be decrypted by authorized nearby clients. The BLE services may allow the computing device to identify/detect nearby clients within a range of 0-20 meters.
- If WiFi-Direct services are used, the computing device (and/or the client) can use an approach similar to the approach of BLE services (e.g., time synchronization) to determine the proximity and/or location data of the client. The WiFi-Direct services may allow the computing device to identify/detect nearby clients within a range of 0-100 meters.
- If WiFi-Hotspot services are used, the computing device (and/or the client) can use a media access control (MAC) address of one or more Wi-Fi routers to determine the proximity and/or location data of the client (e.g., localize nearby clients in a particular hotspot). A next hop address may include or correspond to the WiFi router MAC address. As such, the client(s) with a next hop address corresponding to the address of the WiFi-Hotspot may be nearby.

In one or more of the above approaches, the computing device can (e.g., periodically, prior to, and/or at time of processing the request) receive one or more messages from the nearby client(s), and can use the information in the message(s) to determine the location and/or proximity of the nearly client(s). In addition to the proximity (and/or location) data and/or the information of the structure of the file, the computing device may use or incorporate one or more authentication parameters (e.g., device information, geo-location data, geo-velocity data, and/or other parameters) to determine an indication of trustworthiness of the client and/or the file (e.g., a score). For example, along with a request (e.g., from the client to the computing device) to perform an action to access the file, the client may send, transmit, provide, or otherwise specify at least one of the one or more parameters to authenticate a user or a client device (e.g., a unique device identification number, geo-location data, and/or other parameters). Responsive to receiving the parameter(s), the computing device may use the parameters to determine the indication of trustworthiness (e.g., the score).

In some embodiments, the computing device may use the proximity or location data, the information of the structure of the file (e.g., the first and second computed values), and/or other parameters to calculate, generate, and/or determine a score (e.g., a score for each client in a system). The parameters may include geo-location data, geo-fencing data, geo-velocity data, and/or device information (e.g., a unique device identification number and/or a type of device). If the score meets or exceeds a threshold, the computing device may not perform secondary authentication for the client (e.g., the request, from the client, to perform an action to access a file is a legitimate and/or authentic request). However, if the calculated score fails to satisfy the threshold (e.g., the value of the score is less than the threshold, indicating an insufficient level of trustworthiness, security, and/or validity), the computing device may perform the secondary authentication for the client to verify validity of the request. In some embodiments, the threshold can be specified, determined, and/or configured by a user. In certain embodiments, the threshold may be determined and/or configured according to prior and/or stored historical information, such as prior scores and/or associated risks or negative incidences arising for such prior scores. In some embodiments, the threshold can be determined and used to limit a risk of gaining unauthorized access to a file (and/or other information) to a predetermined level. In some embodiments, the threshold may be configurable and/or modified according to (or based on) a specific environment, context, application and/or user of a client device.

In one example, the value of the threshold may correspond to a value of 0.8 (or other values), wherein the value of the threshold ranges from 0 to 1. In the same example, a user of a client (e.g., an employee) can launch or otherwise initiate a user session from a home location (e.g., a residential address of a user) via the client, for example an office laptop. If the client sends a request (e.g., to the computing device) to perform an action (e.g., a request to download the file from the computing device), the client (e.g., the office laptop) may send, communicate, and/or provide the relevant data (e.g., a first computed value, proximity or location data, geo-location data, a serial number of the client, and/or other data) to the computing device. The computing device may use the received or otherwise obtained data to determine whether the request is sent by a legitimate, authenticated, and/or validated client (e.g., to determine a level of trustworthiness of the client and/or request).

In some embodiments, the computing device may determine the score by calculating one or more values (e.g., a value for indicating a device type or description, a value for a proximity parameter, a value for a geo-location parameter, and/or a value for a file structure parameter) used to determine the score. In the same example, because the user is sending the request via the office laptop, the computing device may determine that a value for indicating a device type or description may correspond to 1 (e.g., a highest score). A value for a proximity parameter (e.g., corresponding to the proximity data) may correspond to 0.6 (or other values), since the client of the user may be located near other clients (e.g., a phone or a desktop) that are used to access the computing device. If, for example, the user of the client sends the request (e.g., to the computing device) from an office location, the value for the proximity parameter may be higher than 0.6 (e.g., given that other clients, used by office colleagues, may be in close proximity to the client). In addition, the computing device may determine that a value for a geo-location parameter may correspond to 0.9 (or other values), given that the user has previously used the client from the home location. Since the user is attempting to access the file via the office laptop (e.g., frequently used by the user to download/upload files), a value for a file structure parameter may correspond to 0.9 (or other values). In this example, the computing device may determine that the average score is 0.85 (or other values). If the calculated average score exceeds the threshold (e.g., 0.8), the computing device can allow the client to perform the requested action to access the file. If instead the calculated average score is less than the threshold, the computing device may perform secondary authentication for the client (e.g., responsive to an indication of trustworthiness of the client).

In another example, the value of the geo-location parameter can be lower (e.g., closer to the lower end of a range from 0 to 1) for a user of a client that travels constantly or frequently. In yet another example, for a user that consistently changes the client (e.g., changes a mobile phone), the value of the file structure parameter can be lower. To consider such scenarios, the computing device may use and/or apply one or more weights to the one or more values used to determine the score (e.g., apply and/or use a particular weight for each value). The one or more weights may be fine-tuned to accommodate or otherwise address the particular needs or activity patterns of the user of the client. In some embodiments, certain approaches (e.g., machine learning algorithms and/or other approaches) may be used to calculate, determine, and/or generate the one or more weights. For example, a machine learning techniques may be used to analyze the actions of the user, and based on (or according to) the analysis, the system may assign, determine, calculate and/or generate the one or more weights. For instance, the value of the geo-location parameter may be lower for a user that travels consistently (e.g., a travelling salesman). As such, a weight that corresponds to (or is associated with) the value of the geo-location parameter for this particular user can decrease, and/or may increase other weights for other parameters (e.g., to avoid performing secondary authentication more than needed).

In some embodiments, the calculated score (e.g., the average score) may be specified by a parameter S, while the threshold can be indicated by a parameter t. The value for each of a a device type or description, a proximity parameter, a geo-location parameter, and a file structure parameter, may be indicated by $p_1$, $p_2$, $p_3$, and $p_4$, respectively. The weight associated with (or corresponding to) individual values for the parameters may be represented by $w_1$, $w_2$, $w_3$, and/or $w_4$, respectively. As such, the score can be calculated or otherwise determined (e.g., by the computing device and/or the client) according to:

$$S=(p_1*w_1+p_2*w_2+p_3*w_3+p_4*w_4)/4$$

If S≥t, the computing device may determine that the request to perform an action is sent by a legitimate or validated client (e.g., the computing device may accept the request). If S<t, the computing device may perform secondary authentication for the client that sent the request to determine whether the request is legitimate and/or authorized.

In some embodiments, each of the one or more values used to determine the score can be assigned a particular weights. Values for individual weights can be based on (or according to) context information of individual users (e.g., data, information, and/or knowledge that can be used to characterize the user). Responsive to evaluating or otherwise determining one or more values, the computing device may determine the score. The computing device can compare the calculated score with the threshold to determine whether to perform secondary authentication (e.g., biometric authentication, OTP authentication, and/or other types of authentication) for the client, on top of primary authentication that is concurrently/already (or to be) performed. If the calculated score meets or exceeds the threshold, the computing device may allow the user (e.g., via the client) to perform the action (e.g., download/upload the file), e.g., without having to pass or otherwise satisfy secondary authentication. If the calculated score is less than the threshold, the computing device may determine to perform the secondary authentication, in addition to primary authentication.

Figure 3:
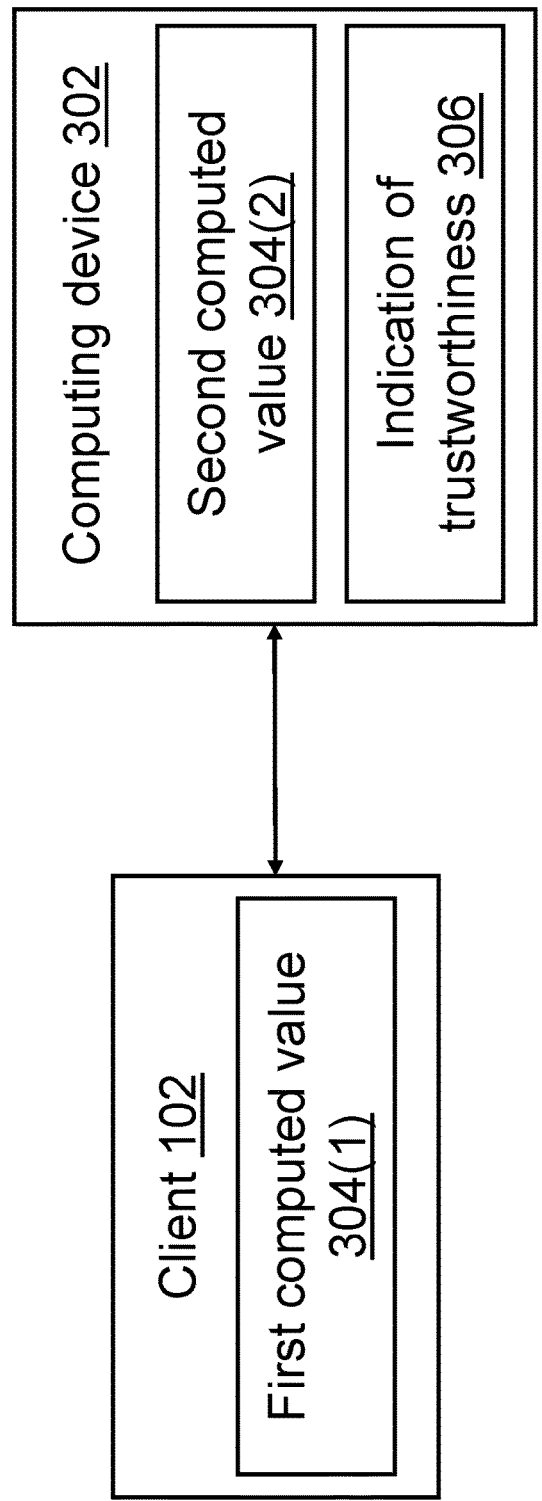
FIGS. 3-4 are block diagrams of systems to perform an action to access a file, in accordance with illustrative embodiments.

In view of the discussion regarding secondary authentication above, a process and/or system for performing secondary authentication (e.g., via an indication of trustworthiness, such as a calculated score) may be beneficial, as further explained in the following passages. Referring to FIG. 3, depicted is a block diagram of one example embodiment of a system 300 for validating a request from a client to perform an action (e.g., to access a file) without affecting a user experience of a user of the client, by increasing an amount of time for performing the action. The system 300 may include one or more clients 102 of an entity, and/or one or more computing devices 302. The computing device 302 can include or maintain or have access to a second computed value 304(2) and/or an indication of trustworthiness 306. The client 102 can include or maintain or have access to a first computed value 304(1).

The above-mentioned elements or entities is implemented in hardware, or a combination of hardware and software, in one or more embodiments. Component of the system 300 may be implemented using hardware or a combination of hardware or software detailed above in connection with FIG. 1C. For instance, each of these elements or entities can include any application, program, library, script, task, service, process or any type and form of executable instructions executing on hardware of a client device 102 and/or a computing device 302 in connection with FIGS. 1B-1C, for instance. The hardware includes circuitry such as one or more processors in one or more embodiments.

The system 300 may include one or more computing devices 302 (e.g., a cluster of servers, a network appliance, a mobile server, and/or other computing devices). The computing device 302 can include a server, such as the server 106 described in connection with FIGS. 1A-1B. The computing device 302 (e.g., a back-end server supporting HTTPS messages or transactions, and/or other servers 106) may be configured and/or designed to host one or more resources (e.g., one or more URLs), services (e.g., application resources, as a web application, SaaS application or remote-hosted network application), and/or files. In some embodiments discussed herein, an object or file may include or correspond to any type or form of file, folder, or data package or container, such as an application file, a Hyper Text Markup Language (HTML) file, a database file, and/or other types of files. An object or file can be any aggregate or container of data that when accessed, updated, transferred and/or modified, can be monitored or tracked (e.g., via a homomorphic hashing process or otherwise). An object or file can also include or correspond to a collection or group of files (e.g., related program files or database record files) or any other types of data container or package. In certain embodiments, an object or file may specify, indicate, or correspond to a webpage, a data record, a data base, and/or other types of files (or collection of files). The computing device 302 can include a device/server of a third party (such as a file sharing service/website). The computing device 302 may be configured and/or designed to provision the one or more resources, services, and/or files to one or more clients 102 of a consumer or other entity (e.g., an organization or user), via one or more networks 104. For example, the client 102 may establish one or more sessions or connections (e.g., secured or otherwise, such as a non-secure (plain TCP) connection) with the computing device(s) 302 to access a service, resource, and/or file, such as an application resource. In another example, the computing device(s) 302 may receive/obtain a request (e.g., a HTTP request) from the client 102 to establish a connection to access one or more resources/files, and/or to perform an action to access a file (e.g., upload and/or download a file). In some embodiments, the computing device(s) 302 can be part of a cloud or datacenter, for instance. The computing device(s) 302 may include any embodiment of volatile memory 122 or non-volatile memory 128 (discussed in FIG. 1C for example) which may store files, data and/or content of the service. The computing device(s) 302 may communicate with other various components of the system 300 in FIG. 3 via a communications interface 118 for instance. Hence, the computing device(s) 302 may be similar in some aspects to the computer 101 described with reference to FIG. 1C.

To provide a service/resource/file, the computing device(s) 302 may execute, provide, provision, and/or host one or more network application(s). In some embodiments, a service/resource may be referred to interchangeably with an application, application resource or network application. A network application can for instance include a remote-hosted application, a remote-hosted desktop, a web application or a software-as-a-service (SaaS) application. A remote-hosted desktop may be a virtual desktop hosted on the computing device 302 which is accessed by or remotely provisioned to the client 102. In some embodiments, the delivery of a remote-hosted desktop may be via a session and/or connection based on High-Definition User Experience (HDX) or Independent Computing Architecture (ICA) display remoting protocol, or Remote Desktop Protocol (RDP). A remote-hosted application may include/correspond to an application service that can be delivered via a HDX-based, ICA-based, RDP-based, etc., session and/or connection. In some embodiments, a remote-hosted application may be an application which is installed on/in the remote-hosted desktop environment and is therefore accessible within the remote-hosted desktop. A SaaS application can be a centrally-hosted application which is typically accessible on a subscription basis. In some embodiments, the SaaS applications may include web-based applications. In other embodiments, the SaaS applications may correspond to remote-hosted applications and, therefore, can be delivered in HDX/ICA/RDP-based sessions and/or connections. SaaS applications and/or web applications may include for instance salesforce.com, SAP, Microsoft Office 365, Dropbox or Gmail service, Amazon web services, and so on.

The computing device 302 (and/or the client 102) may be located at various points or in various communication paths, for example between two networks 104, within a computing and/or network environment 100. In other embodiments, the computing device 302 (and/or the client 102) may be located on a network 104. One or more computing devices 302 may communicate with one another and/or work in conjunction to, for example, accelerate, protect and/or secure network traffic between clients 102 and computing devices 302, and/or provide load balancing of servers 106 to process requests from clients 102. In some embodiments, the one or more computing devices 302 may act as a proxy or access server to provide access to one or more servers 106, provide security and/or act as a firewall between the client 102 and a server 106, and/or provide a secure VPN connection from the client 102 to the server 106, such as a SSL VPN connection and/or provide encryption and decryption operations.

In some embodiments, the computing device 302 can include or maintain, among other elements, a computed value 304, such as a second computed value 304(2). Computed values 304 (e.g., first computed value 304(1) and/or second computed value 304(2)) maintained, computed, and/or stored in/by the computing device 302 and/or the client 102 may be configured and/or designed to indicate, specify, and/or track one or more previous actions on files (e.g., uploads and/or downloads on files). For example, a computed value 304, such as a first and/or second computed value 304, may include or correspond to a homomorphic hash value (e.g., a first homomorphic hash value and/or a second homomorphic hash value). The first computed value 304(1) may be computed, calculated, and/or generated by the client 102, while the second computed value 304(2) can be calculated by the computing device 302. In some embodiments, the computing device 302 may calculate and/or compute the second computed value 304(2) independently and/or separately from the calculation and/or computation of the first computed value 304(1) by the client 102. In another example, the client 102 may send or transmit a request to perform a first action to access a file. If the client 102 performs the first action, the client 102 and/or the computing device 302 may store a computed value 304 (e.g., a first computed value and/or second computed value) of the file, the computed value indicating the first action on the file. In the same example, the client 102 may transmit a request to perform a second action on the file. Responsive to the client 102 sending a request to perform the second action, the client 102 and/or the computing device 302 may incorporate, accumulate, and/or add a value of another computed value 304 to the stored computed value 304. As such, the accumulation and/or incorporation of computed values 304 may specify and/or indicate the first and second actions performed on file(s), thereby tracking one or more previous actions.

The computed value(s) 304 (e.g., the first computed value 304(1), the second computed value 304(2), and/or other computed values) may include, reflect, and/or indicate a structure and/or history of at least one file (e.g., whether a client 102 has performed one or more previous actions on a file). In some embodiments, the history of the file may include or correspond to a cumulative sum of one or more homomorphic hash values (e.g., a first homomorphic hash value and/or a second homomorphic hash value). The one or more homomorphic hash values may include or correspond to one or more hash values of a plurality of downloaded (or uploaded) files (e.g., downloaded/uploaded by the client 102). For instance, if a file is downloaded (or other actions to access the file) by the client 102, the computing device 302 (and/or the client 102) may calculate a cumulative computed value 304 (e.g., a fourth computed value 304) by summing/adding the second (or first) computed value 304(2) to the third computed value 304 of the downloaded file (e.g., calculating the cumulative sum of one or more hash values). Therefore, the cumulative computed value 304 may describe, specify, and/or indicate the history of the file (e.g., describe that the file has been downloaded). The computing device 302 and/or the client 102 can store and/or maintain the cumulative computed value 304, and/or use the cumulative computed value 304 to determine whether another request to perform an action (e.g., from the client 102) is trustworthy, authorized, and/or valid. For instance, the computing device 302 may compare a provided computed value 304 (e.g., provided by the client 102) to the cumulative computed value 304 to determine whether to perform secondary authentication for the client 102. In some embodiments, a computed value 304 (and/or an indication of trustworthiness 306) may be stored and/or maintained in a cache of (e.g., which can be located proximate to and/or separate from) the computing device 302 or client 102, a memory 264 of the computing device 302 or client 102, and/or a physical memory having a faster access time than memory 264. The computed value(s) 304 (and/or an indication of trustworthiness 306) may be located within, outside, or adjacent to the computing device 302 and/or the client 102.

In some embodiments, the computing device 302 may store, maintain, calculate, determine, and/or generate a computed value 304, such as the second computed value 304(2). The computing device 302 may receive/obtain another computed value 304, such as a first computed value 304(1), from the client 102. For example, the client 102 may send, transmit, and/or communicate the first computed value 304(1) to the computing device 302 via (or included in) a request (e.g., a request to perform an action to access a file). In another example, the client 102 may provide/specify the first computed value 304(1) responsive to receiving a request to provide/obtain the first computed value 304(1) (e.g., a request from the computing device 302). The client 102 may provide/indicate/specify the first computed value 304(1) (e.g., by including the first computed value 304(1) in the request) responsive to a user of the client 102 wanting to perform an action on one or more files (e.g., access one or more files). Upon receiving the first computed value 304(1), the computing device 302 may compare the first computed value 304(1) to the second computed value 304(2). The computing device 302 may perform secondary authentication, in addition to primary authentication (e.g., verifying a username and/or a password for the user of the client 102), according to (or based on) the comparison (e.g., the comparison of computed values 304). For instance, if the computing device 302 determines that the first computed value 304(1) fails to correspond to the second computed value 304(2), the computing device 302 may perform secondary authentication for the client 102.

In some embodiments, the computing device 302 can determine, among other elements, an indication of trustworthiness 306. The indication of trustworthiness 306 may provide/specify/indicate a level of trustworthiness of the client 102 and/or the file (e.g., whether the client 102 sending the request to access the file is validated/authenticated/authorized/trustworthy). The indication of trustworthiness 306 of the client 102 and/or the file can be determined according to (or based on) a comparison of computed values 304 (e.g., a comparison of the first computed value 304(1) to the second computed value 304(2)). For instance, if responsive to a comparison, the computing device 302 determines the first computed value 304(1) corresponds to (e.g., matches or is within a defined range/extent of) the second computed value 304(2), the computing device 302 may determine that the request to perform an action on the file (e.g., from the client 102) is trustworthy (e.g., the request is originated/sent by an authorized/validated/trusted client 102). If, for instance, the computing device 302 determines the first computed value 304(1) fails to correspond to (e.g., fails to match or be within a defined range/extent of) the second computed value 304(2) (e.g., according to the comparison), the computing device 302 may determine that the request to perform the action on the file (e.g., from the client 102) is untrustworthy and secondary authentication is needed to be performed by the client 102.

In some embodiments, the indication of trustworthiness 306 may include or correspond to a score (e.g., a security score) indicative of a level of trustworthiness. The computing device 302 may determine/calculate/generate the score according to (or by using) the comparison between the computed values 304 and/or proximity/location data of the client 102 (e.g., GPS data of the client 102, RTT of communications between a first client 102 and a second client 102, and/or other proximity/location data). In some embodiments, the computing device 302 may determine the score according to (or based on) the comparison between the computed values 304 and/or at least one of: device information of the client 102, geo-location data of the client 102, and/or geo-velocity data of the client 102. In order to determine the score, the computing device 302 and/or the client 102 may apply one or more weights (e.g., calculated according to a machine learning algorithm) to one or more values. The one or more values can include or correspond to a value representative of any of a device type or description, a proximity parameter, a geo-location parameter, and/or a file structure parameter. In certain embodiments, the one or more values can be determined/generated/computed/calculated as a result of the comparison between the computed values 304 (e.g., the first computed value 304(1) and/or the second computed value 304(2)).

The system 300 may include one or more clients 102. The client 102 may include or correspond to device(s) of a consumer of a service, and/or to third parties (such as file sharing services/websites) or to such third parties' device(s)/server(s). For example, if the consumer is an individual or user, the client 102 may comprise a smartphone, a laptop (e.g., at home), a tablet device, and a desktop computer (e.g., at work), that the user may use to access an application resource (e.g., Dropbox service), one or more files, and/or other resources at various times and/or locations for instance. In an example where the consumer is an organization, such as an enterprise, the consumer can extend over a number of users (e.g., management persons, staff members, IT administrators, and so on) and their associated client(s) 102 or devices (e.g., corporate-issued device, personally-owned devices, and/or registered/approved devices (e.g., in a BYOD program)). Any number of the users may access a service/resource (e.g., salesforce.com, SAP, Microsoft Office 365) from a service/resource provider, via a corporate account for the service/resource for instance.

The client 102 may be configured and/or designed to access one or more application resources and/or one or more files over the network(s). The client 102 may access one or more files by sending/transmitting/communicating a request to the computing device 302. The request may be to perform an action (e.g., an upload and/or a download), and/or may include a computed value 304 (e.g., a first computed value 304(1)). In certain embodiments, responsive to sending the request/message, the client 102 may receive/obtain a response from the computing device 302. The response from the computing device 302 may include a request to obtain/acquire information and/or data from the client 102 (e.g., device information, proximity information, geo-location data, and/or other client information). In some embodiments, the client 102 may receive/obtain a request to perform secondary authentication (or primary authentication) from the computing device 302 via the response. For example, responsive to receiving a request (e.g., a request to upload/download a file), the computing device 302 may send/transmit a response to the client 102. The response may include a request to perform secondary authentication and/or other information. In some embodiments, the computing device 302 can include, among other elements, a computed value 304, such as a first computed value 304(1). The first computed value 304(1) can be indicative of one or more previous/prior actions on files. The first computed value 304(1) may share one or more properties/characteristics of the computed values 304 discussed in connection with the computing device 302.

Figure 4:
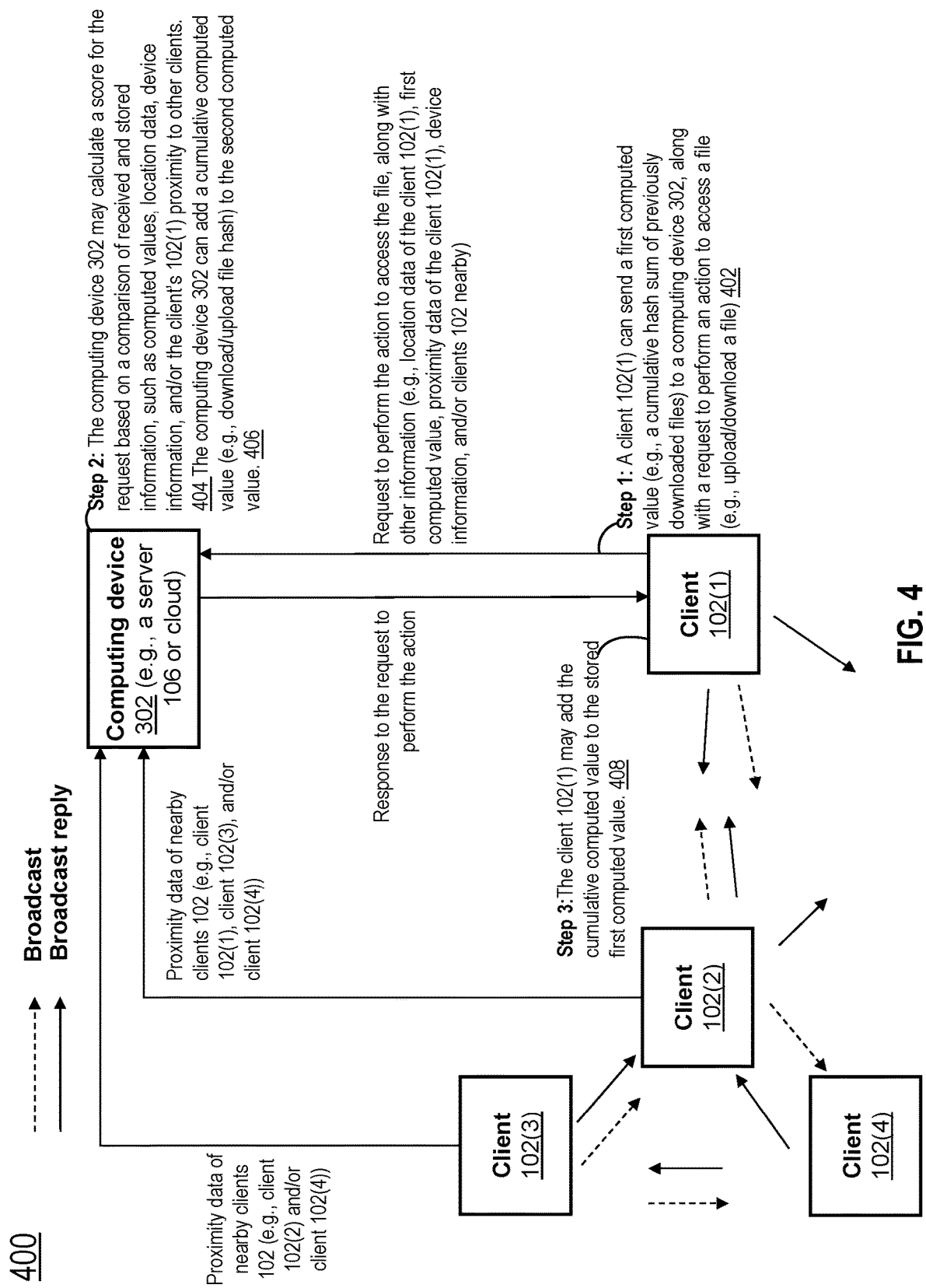

Referring now to FIG. 4, depicted is a block diagram of one example embodiment of a system 400 for validating a request from the client 102 to perform an action. In accordance with system 400, a user of a first client 102(1) may want to perform an action (e.g., to access a file). For example, the user may want to access the file by downloading (or uploading) the file from the computing device 302. As such, the first client 102(1) may send/provide/specify a first computed value 304(1) (e.g., a cumulative hash sum of previously downloaded files) to the computing device 302 (402). For instance, the first client 102(1) may send/transmit a request to perform an action to access the file (e.g., to download the file) to the computing device 302, wherein the request can include/provide/specify the first computed value 304(1). In addition to the first computed value 304(1), the first client 304(1) may indicate/provide/specify proximity or location data corresponding to the first client 102(1), geo-location data corresponding to the first client 102(1), geo-velocity data corresponding to the first client 102(1), device information corresponding to the first client 102(1), and/or other client information/data, to the computing device 302. For example, via the request (e.g., in the metadata of the request) the first client 102(1) may provide proximity/location data, device information (e.g., a unique identification number of the client 102(1), and/or a type of device of the first client 102(1)), and/or client data/information to the computing device 302. In some embodiments, the client information/data (e.g., proximity or location data, device information, and/or data/information) may include information/data corresponding to one or more clients (e.g., a second client 102(2), a third client 102(3), and/or a fourth client 102(4)) that are located near the first client 102(1).

In some embodiments, the computing device 302 may receive/obtain the request to perform an action (e.g., a request from the first client 102(1) to download the file from the computing device 302). Responsive to receiving the request, the computing device 302 may compare the first computed value 304(1) (e.g., received via the request) to the second computed value 304(2). The computing device 302 can maintain/store/calculate the second computed value 304(2), independently from the first computed value 304(1). Responsive to the comparison, the computing device 302 may calculate/generate/determine a value of the file structure parameter (e.g., according to the comparison). In certain embodiments, the computing device 302 may compare stored (e.g., stored by the computing device 302) location/proximity data (and/or device information) to the received (e.g., received from the first client 102(1)) location/proximity data (and/or device information). Responsive to the comparison, the computing device 302 may calculate/generate/determine a value for indicating a device type or description and/or the proximity parameter (e.g., according to the comparison). In some embodiments, and in accordance with system 400, the computing device 302 may verify/determine whether the first client 102(1) is located near (e.g., is in proximity to) other clients (e.g., the second client 102(2), the third client 102(3), and/or the fourth client 102(4)). The computing device 302 can use the result of the determination to calculate/generate the value of the proximity parameter. For instance, if the first client 102(2) is in proximity to other clients 102 (e.g., as determined by the computing device 302 from information received separately from the first client 102(2) and the other clients 102), the calculated value of the proximity parameter may be 0.85 (or other values that reflect close proximity to other clients 102).

Responsive to calculating a value for individual parameters (e.g., a value for each of: the device type or description, the proximity parameter, and/or the file structure parameter), the computing device 302 may calculate a score (404). For example, the computing device 302 may combine (e.g., average) the calculated values for individual parameters to determine the score. In another example, the computing device 302 may determine the score by applying one or more weights to the calculated values. If the determined score meets or exceeds a threshold, the computing device 302 may accept the request to perform the action to access the file, e.g, without performing secondary authentication. For instance, the computing device 302 may determine the request originates (or is sent by) from a trustworthy/authenticated client 102 if the determined score meets or exceeds a threshold. If the determined score fails to meet or exceed the threshold (e.g., the score is less than the threshold), the computing device 302 may determine that the request to perform the action to access the file (and/or the client 102 sending said request) is (potentially) untrustworthy. As such, the computing device 302 may determine to perform secondary authentication for the first client 102(1). In some embodiments, the computing device 302 may determine/select a type/approach of secondary authentication, from a plurality of types/approaches, according to the score. In some embodiments, the computing device 302 may add a value of an additive computed value (e.g., a third computed value 304), corresponding to a hash value of the downloaded/uploaded file, to the second computed value 304(2) stored by the computing device 302 (e.g., calculate a cumulative hash sum) (406). The computing device 302 may use the additive computed value 304 to authenticate (e.g., determine a level of trustworthiness of) future requests to access the file.

In some embodiments, the first client 102(1) may add the value of the additive computed value 304 (e.g., provided by the computing device 302) to the value of the first computed value 304(1) stored by the first client 102(1) (408). For future requests, the first client 102(1) may provide the value of the addition (e.g., addition of the additive computed value 304 and the first computed value 304(1)) to the computing device 302. The computing device 302 may determine whether to perform secondary authentication for the first client 102(1) based on the value of the addition. In some embodiments, the computing device 302 may determine to perform secondary authentication for the first client 102(1). For example, if the computing device 302 (provisionally) rejects/withholds the request to perform the action on the file (e.g., determining the request/client 102 is untrustworthy), for instance pending further evaluation, the computing device 302 may perform the secondary authentication (as part of the further evaluation).

Figure 5:
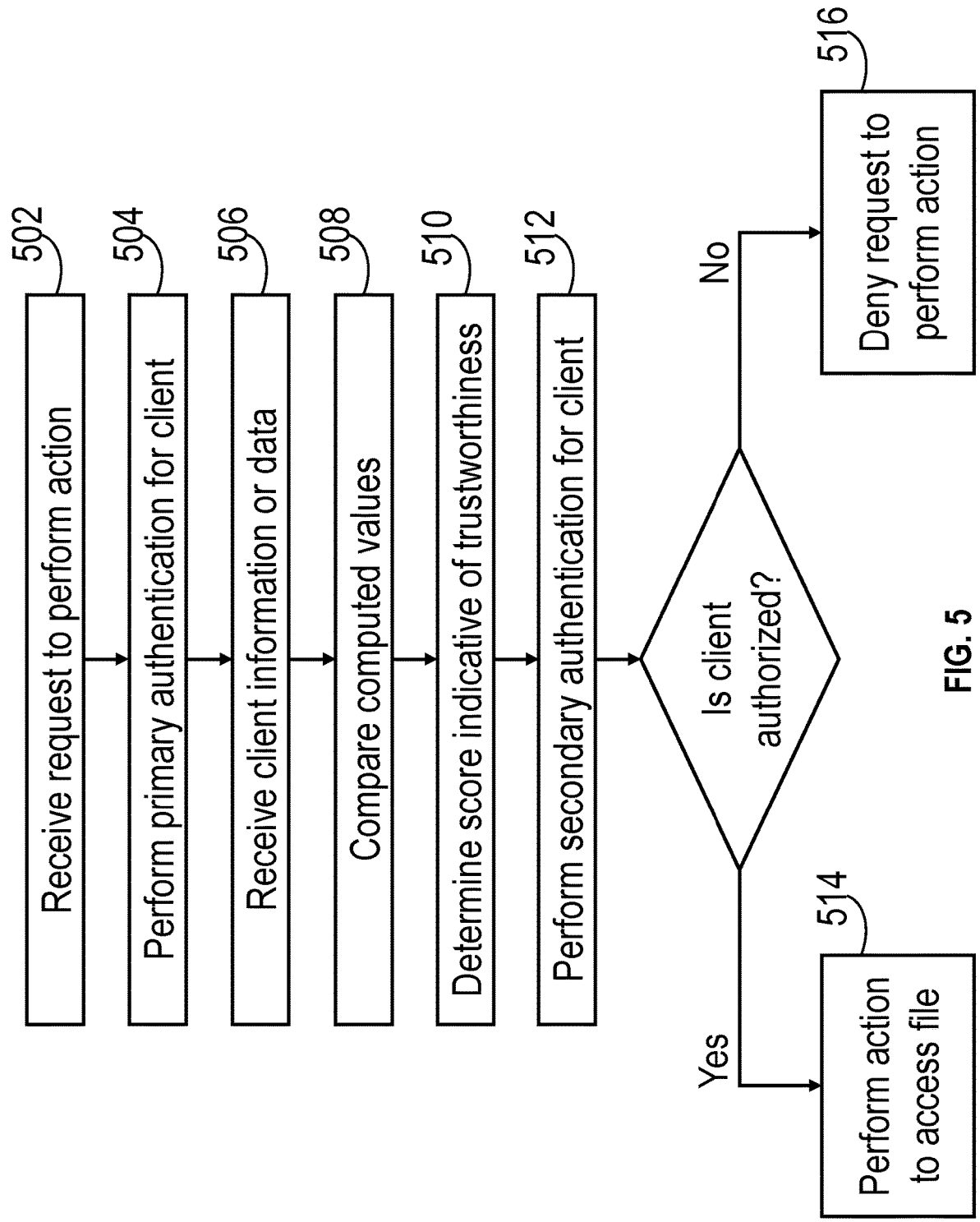
FIG. 5 is a flow diagram of a system to perform an action to access a file, in accordance with an illustrative embodiment.

Referring to FIG. 5, depicted is a flow diagram of one embodiment of a method for validating a request to perform an action. The functionalities of the method may be implemented using, or performed by, the components detailed herein in connection with FIGS. 1-4. In brief overview, a computing device 302 may receive a request to perform an action (e.g., to access a file) (502). The computing device 302 may perform primary authentication of the client 102 (504). The computing device 302 may receive client information (e.g., device information) and/or data (e.g., geo-location data and/or geo-velocity data) (506). The computing device 302 may compare computed values 304, such as a first computed value 304(1) and/or a second computed value 304(2) (508). The computing device 302 may determine a score indicative of trustworthiness (510). The computing device 302 may perform secondary authentication of the client 102 (512).

Referring now to operation (502), and in some embodiments, a computing device 302 (e.g., a server and/or other devices) may receive and/or obtain a request from a client 102. The request can be to perform and/or execute an action (e.g., an upload and/or a download) to access, use, obtain, and/or retrieve a file. In some embodiments, the action to access and/or retrieve the file may comprise at least one of: upload of the file to the computing device 302 and/or download of the file from the computing device 302. The request may include a first computed value 304(1) (e.g., a hash value, such as a homomorphic hash value) and/or other information. The first computed value 304(1) may be indicative of one or more previous/prior actions on files. For instance, the first computed value 304(1) (and/or other computed values 304) can indicate and/or specify whether a file has been previously downloaded, uploaded, and/or edited by the client 102. In some embodiments, the client 102 and/or the computing device 302 can use the first computed value 304(1) (and/or other computed values describing and/or indicating one or more previous/prior actions on files) to maintain, store, and/or track a history of the file. In operation (504), and in some embodiments, the computing device 302 may perform and/or execute primary authentication of the client 102. For instance, responsive to receiving/obtaining the request (e.g., the request to perform an action on the file), the computing device 302 may perform the primary authentication (e.g., verification of a username, a password, and/or other credentials for a user) of the client 102.

Referring now to operation (506), and in some embodiments, the computing device 302 may receive/obtain client information and/or client data, e.g., to determine whether secondary authentication is to be performed. For instance, the computing device 302 may receive, from the client 102 (e.g., the client 102 sending the request), at least one of: device information (e.g., a unique device identification number and/or a type of device), geo-location data (e.g., data used to identify a location of the client 102), and/or geo-velocity data corresponding to the client 102. In some embodiments, the computing device 302 may receive the client information and/or client data via the request (e.g., the request to perform an action to access a file). For example, the request may include, provide, indicate, and/or specify the client information and/or client data. In another example, the computing device 302 may obtain the client information and/or client data separate from the request (e.g., via another request/message from the client 102). For instance, the client 102 may send, transmit, provide, and/or broadcast the client information and/or client data (e.g., to the computing device 302) responsive to receiving a request (e.g., from the computing device 302) to obtain the client information and/or client data.

Referring now to operation (508), and in some embodiments, the computing device 302 may compare computed values 304, e.g., to determine whether secondary authentication is to be performed. For example, the computing device 302 may compare the first computed value 304(1) to a second computed value 304(2) (or other computed values). If the computing device 302 determines that the first computed value 304(1) corresponds to (or matches or is within a defined range or extent of) the second computed value 304(2), the computing device 302 may determine that the received request (e.g., the request to perform an action) is trustworthy (e.g., sent by an authenticated and/or validated client 102). If, for instance, the computing device 302 determines that the first computed value 304(1) does not correspond to (e.g., fails to match or be within a defined range or extent of) the second computed value 304(2), the computing device 302 may determine to perform secondary authentication for the client 102 (e.g., the request is untrustworthy). The computing device 302 can maintain and/or store the second computed value 304(2) (and/or other computed values) independently and/or separately from the first computed value 304(1). The second computed value 304(2) may be indicative of the one or more previous actions on the files. For instance, for a particular file, the computing device 302 and/or the client 102 can maintain/track/determine a history (e.g., a record of the action(s) performed by the client 102) of the particular file via (or by using) the first and/or second computed values 304. In some embodiments, the first computed value 304(1) may comprise a first homomorphic hash value computed by the client 102. The second computed value 304(2) may comprise a second homomorphic hash value computed by the computing device 302. The computation of the second homomorphic hash value can be performed, done, and/or executed independently (or separately) from the computation of the first homomorphic hash value by the client 102.

Referring now to operation (510), and in some embodiments, the computing device 302 may determine, generate, calculate, and/or compute a score indicative of trustworthiness. In certain embodiments, the computing device 302 may determine, generate, calculate, and/or configure the score according to (or based on) the comparison (e.g., proximity, closeness, and/or extent of the matching) of the first computed value 304(1) to the second computed value 304(2). For instance, if the computing device 302 determines that the first computed value 304(1) corresponds to the second computed value 304(2), the computing device 302 may determine a value for the score (e.g., according to the proximity, closeness, and/or extent of the matching) that indicates a high level of trustworthiness. If on the other hand, the computing device 302 determines that the first computed value 304(1) fails to correspond to the second computed value 304(2), the computing device 302 may determine a value for the score that indicates a low level of trustworthiness In some embodiments, the computing device 302 can determine the score according to (or based on) the comparison of the computed values 304 and/or the client information/data (e.g., device information, geo-location data, geo-velocity data, and/or other data/information). In another example, the proximity (and/or location) data, the computed values 304, and/or one or more authentication parameters (e.g., device information, geo-location data, geo-velocity data, and/or other parameters) may be used to determine the score.

In some embodiments, determining, generating, and/or computing the score may comprise applying one or more weights (e.g., apply/use a particular weight) to one or more values (e.g., a value for each of: a value for indicating a device type, a proximity parameter, a geo-location parameter, and/or a file structure parameter). The one or more values can be used to determine the score. For instance, the one or more values can indicate/specify a level of trustworthiness for each parameter (e.g., a value for indicating a device type, a proximity parameter, a geo-location parameter, and/or a file structure parameter), such that the one or more values can be combined (e.g., averaged) to determine the score (e.g., an aggregate score). At least one of the one or more values (e.g., the value of the file structure parameter) may comprise a result of the comparison (e.g., the comparison between the computed values 304). In certain embodiments, the one or more weights can be generated, calculated, and/or computed by the computing device 302. The computing device 302 may generate the one or more weights to apply to the one or more values. The one or more weights may be optimized (e.g., by the computing device 302) to accommodate and/or address the particular needs and/or activity patterns of a user of the client 102. Certain approaches, such as machine learning approaches, may be used to calculate/determine/generate the one or more weights. For example, a machine learning model may be used to analyze the actions of the user, and based on (or according to) the analysis, the model may assign, determine, calculate, and/or generate the one or more weights.

Referring now to operation (512), and in some embodiments, the computing device 302 may perform and/or execute secondary authentication for the client 102. For instance, the computing device 302 may perform secondary authentication (e.g., OTP authentication, biometric authentication, and/or other types of secondary authentication), in addition to primary authentication, for the client 102. The computing device 302 may perform the secondary authentication responsive to an indication of trustworthiness 306 (or untrustworthiness) of the client 102, request and/or the file. The indication of trustworthiness 306 may be according to (e.g., determined according to) the comparison of the computed values 304 (e.g., the first computed value 304(1) and the second computed value 304(2)). Responsive to performing the secondary authentication, the computing device 302 may determine whether the client 102 is authorized to perform the action to access a file (e.g., download and/or upload a file). If the client 102 is authorized, the client 102 may perform the action to access the file (514). For instance, the client 102 may download and/or upload the file via the computing device 302. If the client 102 is unauthorized, the computing device 302 may deny the request from the client 102 to perform the action to access the file (516). As such, the client 102 may be unable to perform the action to access the file. In some embodiments, the computing device 302 may perform another secondary authentication for the client 102 responsive to determining that the client 102 is unauthorized to perform the action to access the file.

In some embodiments, the secondary authentication of the client 102 may be performed (e.g., by the computing device 302) responsive to a result of the comparison (e.g., extent of matching) failing to satisfy a threshold. For example, if the result of a comparison between the computed values 304 meets or exceeds the threshold (e.g., a predetermined/pre-configured threshold), the computing device 302 may determine that the request, from the client 102, to perform an action to access a file is trustworthy and/or legitimate. However, if the result of the comparison fails to satisfy the threshold (e.g., the value of the result of the comparison is less than the threshold), the computing device 302 may determine to perform and/or execute the secondary authentication for the client 102 (e.g., to determine and/or confirm whether the request/client is trustworthy).

In some embodiments, the computing device 302 may receive and/or obtain proximity and/or location data of the client 102. The computing device 302 (and/or the client 102) may determine the proximity (and/or location) data of the client 102 based on (or by using) radio signaling (or other types of signaling), such as BLE signaling, WiFi-Direct signaling, and/or other types of radio signaling. For instance, the computing device 302 may use GPS data to determine the proximity and/or location data of the client 102 (e.g., a quantity/amount of nearby clients 102 within a same radius). In one example, wherein the client 102 can be a first client 102, the proximity and/or location data may comprise at least one of: GPS data corresponding to a location of the first client 102, ranging data between the first client 102 and a second client 102 (e.g., synchronized clocks and/or encrypted messages between the first client 102 and the second client 102), connection data regarding a network to which the first client 102 and the second client 102 are connected (e.g., a MAC address of one or more Wi-Fi routers), a RTT of communications between the first client 102 and the second client 102 (e.g., RTT between a packet and a corresponding acknowledgement), and/or other proximity/location data.

In some embodiments, the computing device 302 may determine the score, wherein the score is indicative of the level of trustworthiness. The level of trustworthiness may be determined according to (or based on) the comparison (e.g., the comparison between the first computed value 304(1) and the second computed value 304(2)) and/or the proximity/location data. In some embodiments, the computing device 302 may receive/obtain proximity and/or location data from the second client 102 (that is near the requesting first client 102). The computing device 302 may verify, confirm, and/or validate the proximity and/or location data of the first client 102 according to (or by using) the proximity and/or location data received from the second client 102. For instance, the computing device may obtain proximity and/or location data by using BLE services (or other services). If BLE services are used, the synchronized clock of the second client 102 can be used to determine and/or verify the proximity and/or location data of the first client 102. In one example, Bluetooth signaling can be used to obtain proximity and/or location data. Bluetooth signaling can be enabled for a certain period of time (e.g., once every 30 seconds) to broadcast, send, and/or transmit encrypted messages from the second client 102, wherein the encrypted messages can be decrypted by the first client 102.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method comprising:
  receiving, by a computing device, a request from a client, the request being to perform an action to access at least one file and including a first computed value indicative of one or more previous actions on files;
  comparing, by the computing device, the first computed value to a second computed value maintained by the computing device independently from the first computed value, the second computed value indicative of the one or more previous actions on the files; and performing, by the computing device, secondary authentication in addition to primary authentication for the client, responsive to an indication of trustworthiness of the client or the at least one file according to the comparison of the first computed value to the second computed value.

2. The method of claim 1, comprising:
receiving, by the computing device, proximity or location data of the client; and
determining, by the computing device, a score indicative of a level of trustworthiness according to the comparison and the proximity or location data.

3. The method of claim 2, wherein the client is a first client, and wherein the proximity or location data comprises at least one of: global positioning system (GPS) data corresponding to a location of the first client, ranging data between the first client and a second client, connection data regarding a network to which the first client and the second client are connected, or round-trip time of communications between the first client and the second client.

4. The method of claim 3, comprising:
receiving, by the computing device, proximity or location data from the second client; and
verifying, by the computing device, the proximity or location data of the first client according to the proximity or location data received from the second client.

5. The method of claim 2, wherein determining the score comprises applying one or more weights to one or more values used to determine the score, wherein at least one of the one or more values comprises a result of the comparison.

6. The method of claim 5, comprising generating, by the computing device, the one or more weights to apply to the one or more values.

7. The method of claim 1, wherein the action to access the at least one file of the files comprises at least one of: upload of the at least one file to the computing device or download of the at least one file from the computing device.

8. The method of claim 1, wherein the first computed value comprises a first homomorphic hash value computed by the client, and the second computed value comprises a second homomorphic hash value computed by the computing device independently from the computation of the first homomorphic hash value by the client.

9. The method of claim 1, comprising:
receiving, from the client, at least one of: device information, geo-location data, or geo-velocity data corresponding to the client; and
determining, by the computing device, a score indicative of a level of trustworthiness according to the comparison and the at least one of: the device information, the geo-location data, or the geo-velocity data corresponding to the client.

10. The method of claim 1, comprising:
performing, by the computing device, the primary authentication of the client in response to the request; and
performing, by the computing device, the secondary authentication of the client responsive to a result of the comparison not satisfying a threshold.

11. A computing device comprising:
at least one processor configured to:
receive a request from a client, the request being to perform an action to access at least one file, and including a first computed value indicative of one or more previous actions on files;
compare the first computed value to a second computed value maintained by the computing device independently from the first computed value, the second computed value indicative of the one or more previous actions on the files; and
perform secondary authentication in addition to primary authentication for the client, responsive to an indication of trustworthiness of the client or the at least one file according to the comparison of the first computed value to the second computed value.

12. The computing device of claim 11, wherein the at least one processor is configured to receive proximity or location data of the client, and determine a score indicative of a level of trustworthiness according to the comparison and the proximity or location data.

13. The computing device of claim 12, wherein the client is a first client, and wherein the proximity or location data comprises at least one of: global positioning system (GPS) data corresponding to a location of the first client, ranging data between the first client and a second client, connection data regarding a network to which the first client and the second client are connected, or round-trip time of communications between the first client and the second client.

14. The computing device of claim 13, wherein the at least one processor is configured to:
receive proximity or location data from the second client; and
verify the proximity or location data of the first client according to the proximity or location data received from the second client.

15. The computing device of claim 12, wherein the at least one processor is configured to determine the score by:
generating one or more weights to apply to one or more values used to determine the score; and
determining the score comprises applying the one or more weights to the one or more values, wherein at least one of the one or more values comprises a result of the comparison.

16. The computing device of claim 11, wherein the action to access the at least one file of the files comprises at least one of: upload of the at least one file to the computing device or download of the at least one file from the computing device.

17. The computing device of claim 11, wherein the first computed value comprises a first homomorphic hash value computed by the client, and the second computed value comprises a second homomorphic hash value computed by the at least one processor independently from the computation of the first homomorphic hash value by the client.

18. The computing device of claim 11, wherein the at least one processor is configured to receive, from the client, at least one of: device information, geo-location data, or geo-velocity data corresponding to the client, and determine a score indicative of a level of trustworthiness according to the comparison and the at least one of: the device information, the geo-location data, or the geo-velocity data corresponding to the client.

19. The computing device of claim 11, wherein the at least one processor is configured to:
perform the primary authentication of the client in response to the request; and
perform the secondary authentication of the client responsive to a result of the comparison not satisfying a threshold.

20. A non-transitory computer-readable medium storing instructions that, when executed by one or more processors, cause the one or more processors to:

receive a request from a client, the request being to perform an action to access at least one file, and including a first computed value indicative of one or more previous actions on files;

compare the first computed value to a second computed value maintained by a computing device independently from the first computed value, the second computed value indicative of the one or more previous actions on the files; and perform secondary authentication in addition to primary authentication for the client, responsive to an indication of trustworthiness of the client or the at least one file according to the comparison of the first computed value to the second computed value.

* * * * *